United States Patent
Schmidt et al.

(10) Patent No.: US 8,909,405 B2
(45) Date of Patent: Dec. 9, 2014

(54) METHOD AND DEVICE FOR CONTROLLING AN INTERNAL COMBUSTION ENGINE

(71) Applicants: Matthias Schmidt, Stuttgart (DE); Axel Reuter, Vaihingen An der Enz (DE)

(72) Inventors: Matthias Schmidt, Stuttgart (DE); Axel Reuter, Vaihingen An der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/894,675

(22) Filed: May 15, 2013

(65) Prior Publication Data

US 2013/0311022 A1    Nov. 21, 2013

(30) Foreign Application Priority Data

May 21, 2012   (DE) .......................... 10 2012 208 462

(51) Int. Cl.
*B60W 20/00*   (2006.01)
*B60W 10/26*   (2006.01)
*B60W 10/08*   (2006.01)

(52) U.S. Cl.
CPC ......... *B60W 20/00* (2013.01); *B60W 2710/086* (2013.01); *B60W 20/106* (2013.01); *Y10S 903/903* (2013.01); *B60W 10/26* (2013.01); *B60W 2710/083* (2013.01); *B60W 10/08* (2013.01)

USPC .............................................. 701/22; 903/903

(58) Field of Classification Search
CPC .... B60W 20/00; B60W 10/08; Y02T 10/642; Y02T 10/7044
USPC ............................................................. 701/22
See application file for complete search history.

(56) References Cited

U.S. PATENT DOCUMENTS

| | | | |
|---|---|---|---|
| 6,892,128 B2 * | 5/2005 | Asakawa et al. | 701/103 |
| 7,590,477 B2 * | 9/2009 | Loeffler | 701/36 |
| 7,610,124 B2 * | 10/2009 | Wakashiro et al. | 701/22 |
| 7,758,468 B2 * | 7/2010 | Vafidis et al. | 477/115 |
| 8,296,032 B2 * | 10/2012 | Wang et al. | 701/84 |
| 8,473,133 B2 * | 6/2013 | Wang et al. | 701/22 |

FOREIGN PATENT DOCUMENTS

| | | |
|---|---|---|
| DE | 103 18 882 | 11/2004 |
| DE | 103 20 834 | 12/2004 |
| DE | 103 46 213 | 4/2005 |
| DE | 10 2007 060 416 | 9/2008 |

* cited by examiner

*Primary Examiner* — Thomas Tarcza
*Assistant Examiner* — Alex C Dunn
(74) *Attorney, Agent, or Firm* — Kenyon & Kenyon LLP

(57) ABSTRACT

A device for operating a drivetrain, which drivetrain includes an electrical machine, has an energy management unit and an electrical machine management unit. The energy management is configured for transmitting a desired electrical, and/or a lower electrical limit, and/or an upper electrical limit power to the electrical machine management unit.

11 Claims, 6 Drawing Sheets

METHOD AND DEVICE FOR CONTROLLING AN INTERNAL COMBUSTION ENGINE

BACKGROUND OF THE INVENTION

1. Field of the Invention

The present invention relates to a method for controlling and/or regulating an electric drive in hybrid vehicles, in particular, for entry-level hybridizations having voltages lower than 60 V. Other aspects of the present invention relate to a computer program for carrying out the method according to the present invention, an electrical storage medium for storing such a computer program, as well as a control and/or regulating device configured for carrying out the method according to the present invention.

2. Description of the Related Art

Within the framework of the public debate about $CO_2$, as well as steadily rising fuel prices, systems for reducing fuel consumption and, thus, $CO_2$ emissions are gaining in importance. Against this background, a hybridization of the drivetrain is becoming increasingly important.

One of the inherent objectives of hybrid vehicles is to reclaim (recuperate) the kinetic energy released during braking, respectively the potential energy released during downhill driving. They may be utilized, for example, for supplying power to the vehicle electrical system, thereby substantially influencing fuel consumption.

If the electrical machine also permits a motor operation through the use of a power inverter, then the driving torque of the combustion engine can be increased by an electric moment (boost), for example, to enhance drivability. In addition, if more energy is recovered by recuperation than is needed for supplying the vehicle electrical system or for the boost function, for example, then it is also possible to selectively reduce the driving torque of the combustion engine and to compensate for the same through an electric moment.

The fuel consumption can be further reduced by such a load-point shift. Thus, hybridization of the drivetrain requires a suitable electrical machine and a suitable energy accumulator, such as a lithium-ion battery, as a power battery, as well as an appropriate control strategy.

In hybrid vehicles, the electric drive can either be used as a source of motive power to assist the combustion engine, or it can be used regeneratively, for example, to recapture braking energy. However, if the power battery has a low state of charge or, generally, a poor state, for example, due to temperature or aging, a regenerative operation can be necessary even outside of the braking phases. In this case, the electric drive is not driven by the kinetic, respectively potential energy of the vehicle. Rather, it must be driven by the combustion engine which requires using additional fuel to produce current to charge the power battery, respectively to supply the vehicle electrical system. In this case, the regenerative operation leads to an increase in fuel consumption.

To regulate the operating modes of the electric drive, thus, both of the motive and regenerative power thereof, various energy management strategies are possible. The aim of these strategies can be to adjust a setpoint state of charge. Following a recuperation phase and, thus, a state of charge greater than the setpoint state of charge, this leads to a boost phase being introduced until the setpoint state of charge is adjusted. However, if the driver requires an electric assist for an extended period of time, then, following this boost phase, the attempt would likewise be made to restore the setpoint state of charge as quickly as possible by a regenerative operation of the electric drive, in this case, using fuel to drive the electric drive in regenerative mode. The aim of readjusting the setpoint state of charge as fast as possible leads to a cycling and thus aging of the power battery.

Published German Patent Application document DE 103 46 213 A1, for example, describes a method for regulating the state of charge of an energy accumulator in the case of a vehicle having a hybrid drive where the state of charge of the energy accumulator is regulated by a charge controller as a function of the driving speed of the vehicle.

BRIEF SUMMARY OF THE INVENTION

In contrast, it is an advantage of the present invention that an especially simple partitioning of the system into electrical and mechanical variables is possible, so that a simple and rugged control of the system may be implemented.

The present invention encompasses a device for operating a drivetrain that includes an electrical machine, having an energy management and an electrical machine management, the energy management being configured for transmitting a desired electric power and/or a lower electrical limit and/or an upper electrical limit to the electrical machine management. The energy management permanently transmits these variables to the electrical machine management, thus, for example, for each clock cycle of a bus communication system, to which the two are connected. This meaning of the term "transmit" also holds for all of the following aspects of the present invention.

In a further aspect of the present invention, the device may be configured for operating the drivetrain in such a way that a power generated by the electrical machine is less than or equal to the power that corresponds to the upper electrical limit, and is greater than or equal to the power that corresponds to the lower electrical limit. This makes it possible for the energy management to very readily ensure the power limits within which the electrical machine is operated, i.e., the responsibility for the reliable operation of the electrical machine is encapsulated with the energy management.

Another aspect of the present invention provides that the device for operating the drivetrain include a powertrain management designed for transmitting a desired mechanical torque to the electrical machine management, the electrical machine management being designed for controlling the electrical machine to generate the desired mechanical torque. This renders possible a more extensive and especially simple partitioning of the system: The energy management controls the essential electrical variables for controlling the electrical machine; the powertrain management controls the mechanical variables for controlling the electrical machine, and the electrical machine management, which also controls the electrical machine, functions as a link between these two domains (electrical/mechanical).

Another aspect of the present invention may provide for the electrical machine management to be designed for transmitting a desired mechanical torque and/or a lower mechanical limit and/or an upper mechanical limit to the powertrain management. Instead of the torques, it is self-evident that equivalent variables, such as power levels, may also be transmitted. In accordance with this aspect of the present invention, the limitation of the torque of the electrical machine, for example, is readily coordinated in the powertrain management.

Another aspect of the present invention may provide for the electrical machine management to include a conversion block designed for converting a desired electric power into a desired mechanical torque and/or a lower electrical limit into a lower mechanical limit and/or an upper electrical limit into a mechanical limit. This makes the connection between electrical domains and mechanical domains particularly simple.

Another aspect of the present invention may provide for the energy management to be designed for receiving a state of charge from a power battery that is electrically coupled to the electrical machine, and/or a battery current and/or a battery voltage. In an especially simple manner, this makes it possible to allow for the state of the power battery and thus to effectively minimize a cycling of the same.

Another aspect of the present invention may provide for the electrical machine management to be designed for determining a current flow of the electrical machine and for transmitting the same to the energy management. This current flow, which, for example, may be measured or also mathematically determined, for example, using a model or on the basis of inherent characteristics, makes it especially simple for the energy management to determine the current flows in the vehicle electrical system.

Further aspects of the present invention relate to the integration of the aforementioned management components in control units. The following exemplary embodiments of integration of these management components may be combined in any desired manner with the aforementioned aspects which all relate to the communication among these management components, in order to achieve further advantageous effects.

In a first of these aspects relating to the integration, it may be provided for the electrical machine management to be integrated in a control unit for controlling the electrical machine. This renders possible an especially efficient wiring and an installation space-saving setting-up of the electrical machine management.

Another aspect of the present invention may provide for at least two of energy management, electrical machine management and powertrain management to be integrated in a shared control unit. This renders possible a more extensive and efficient cabling and also makes it possible to keep the packaging costs for control units low.

Another aspect of the present invention may provide for the energy management to be integrated in the control unit for controlling the electrical machine. This makes it especially simple to integrate all of the electrical aspects of the management components relating to the drivetrain management in one product and renders possible an especially simple integration in existing drivetrain concepts.

Yet another aspect of the present invention may provide that the powertrain management not be integrated in the control unit for controlling the electrical machine. A complete partitioning, including a particularly simple interchangeability of components between electrical domains and mechanical domains is possible, in particular, when the powertrain management also includes the motor control.

An alternative aspect of the present invention may provide that a control unit include both an energy management, as well as a powertrain management. This renders possible an especially simple and economic approach for holistically managing the components of the drivetrain.

Another aspect of the present invention may provide that the control unit not include the electrical machine management. This renders possible an especially simple partitioning between the components relating directly to the electrical machine and the management functions (both electrical as well as mechanical) of the drivetrain.

DETAILED DESCRIPTION OF THE INVENTION

Figure 1:
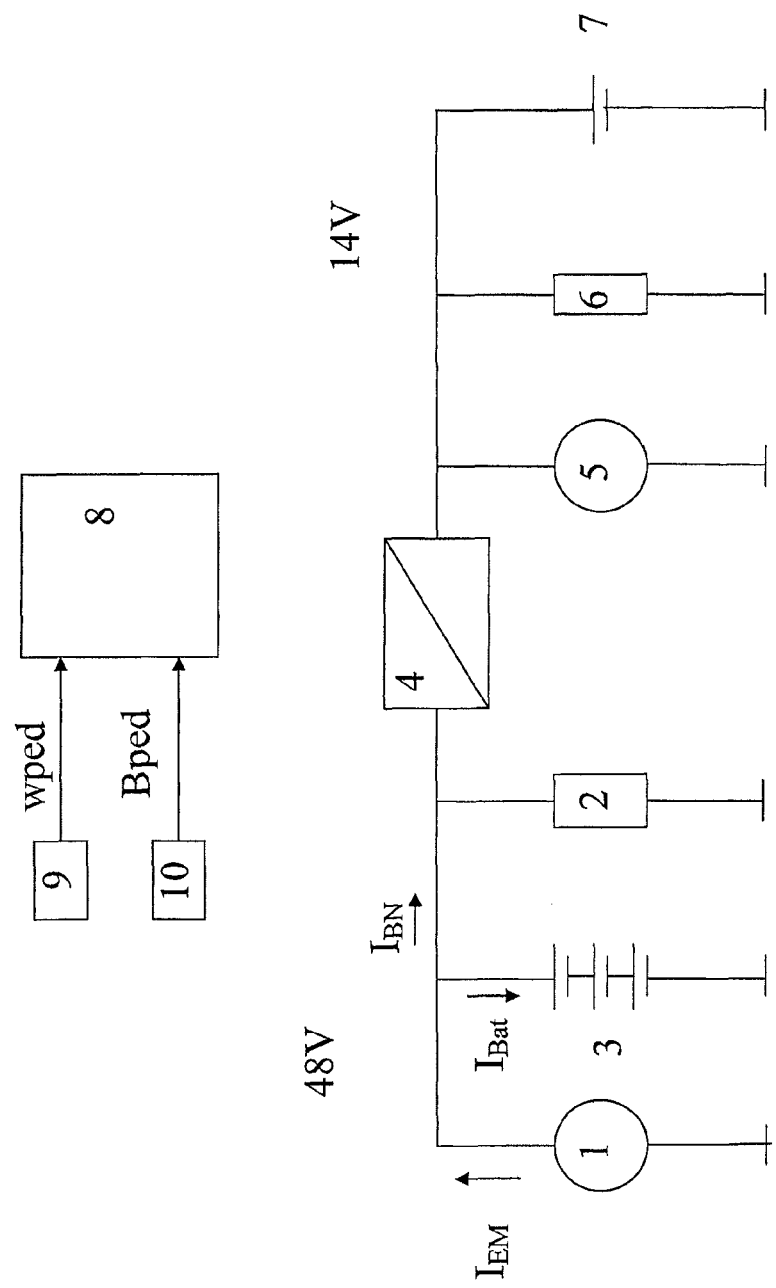
FIG. 1 schematically shows a twin-voltage electrical system.

FIG. 1 shows schematically a twin-voltage electrical system of a hybridized drivetrain having a 14 volt low-voltage electrical system and a 48 volt high-voltage electrical system. In the high-voltage section of the electrical system, electrical machine 1, for example, a starter generator 1, further electrical consumers 2 (only shown schematically) and a power battery 3 are present. In the low-voltage region of the vehicle electrical system, a starter 5, which may be used, for example, for conventional starts, further electrical consumers 6 (only shown schematically), as well as a conventional battery 7 are present. A DC-DC converter 4 couples the high-voltage sections and the low-voltage section of the vehicle electrical system. The components of the drivetrain are controlled and/or regulated, for example, by control and/or regulation device 8 (referred to, in short, in the following as "control unit"), in which the method according to the present invention may also be implemented by a computer program stored in an electrical storage medium.

A current flow $I_{EM}$ of electrical machine 1 flows from electrical machine 1. This current flow $I_{EM}$ of electrical machine 1 is divided into a battery current $I_{Bat}$, which charges power battery 3, and a vehicle's electrical system current $I_{BN}$, which makes available the remaining portion of current $I_{EM}$ of the electrical machine, that is not fed to power battery 3, to the remaining components of the remaining vehicle system. A battery voltage $U_{Bat}$ drops across power battery 3.

An accelerator pedal 9, respectively a brake pedal 10 provides control unit 8 with the actuation levels thereof via a respective sensor system. Accelerator pedal 9 transmits actuation level wped thereof to control unit 8; brake pedal 10 transmits actuation level Bped thereof to control unit 8. In particular, in control unit 8, an evaluation logic may be provided that decides how to proceed in the case that both the actuation level of the accelerator pedal, as well as of the brake pedal are ≠0. It is possible in this context, for example, that, in such a case, the actuation level of accelerator pedal wped is set internally to 0, and, thus, the actuation level of the brake pedal takes precedence. If the actuation level of the accelerator pedal, respectively of the brake pedal is concerned in the following, then this is always to be understood in the sense of actuation levels that were evaluated by this type of evaluation logic, so that, in particular, always at least one of the two variables wped, BPed is =0.

The control unit ascertains state of charge SOC of power battery 3 via a suitable sensor system or using appropriate methods, for example.

Figure 2:
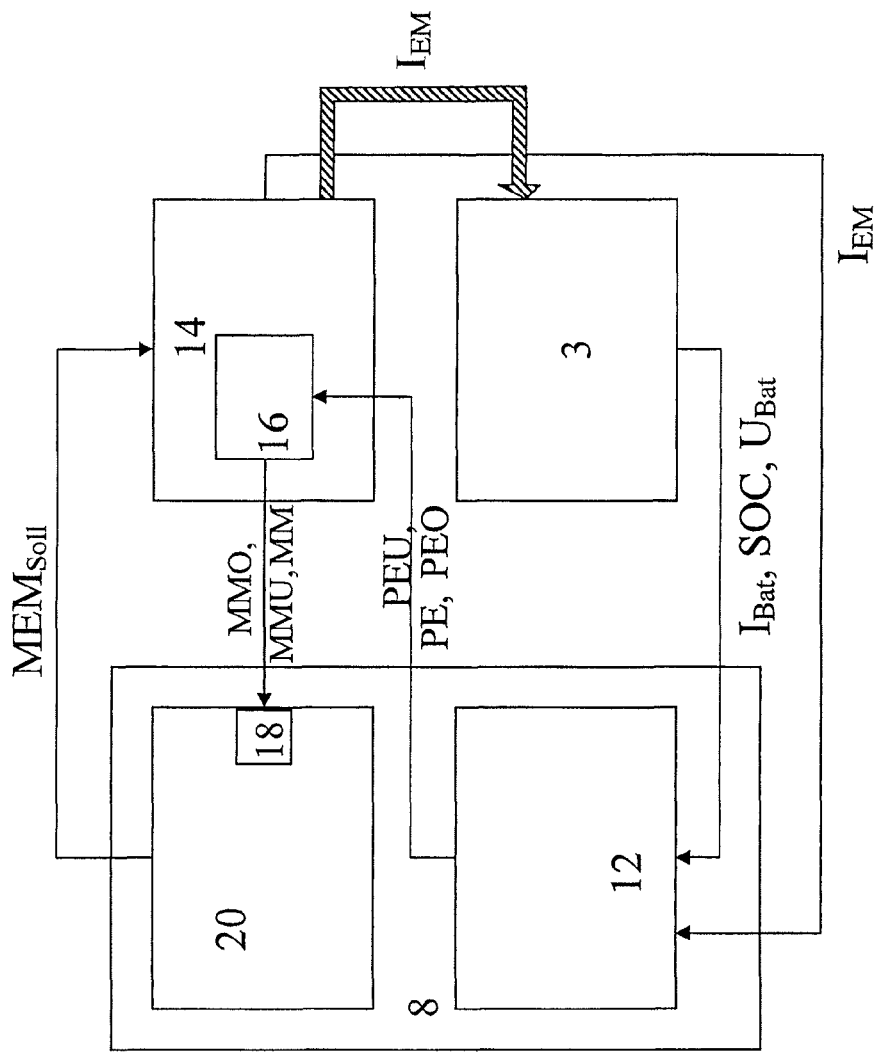
FIG. 2 schematically shows the structure of information flows for controlling the electrical machine.

FIG. 2 shows schematically the structure of control components of the drivetrain. Essentially, this is electrical machine management 14 that includes a conversion block 16. Electrical machine management 14 is structurally integrated, for example, in electrical machine 1.

Conversion block 16 receives desired electric power PE, as well as an upper electrical limit PEO and/or a lower electrical limit PEU, which both likewise relate to power levels.

In addition, conversion block 16 receives a speed of electrical machine 1 that is determined by a sensor, for example. This sensor may, for example, also capture the rotational speed of a crankshaft from which the speed of electrical machine 1 is ascertained.

From desired electric power PE, conversion block 16 determines desired mechanical torque MM. Analogously, from upper electrical limit PEO and/or lower electrical limit PEU, upper mechanical limit MMO, respectively lower mechanical limit MMU are determined. This determination is made using characteristic maps, for example, which may be obtained in trials or on the basis of theoretical considerations in which the relationship between the generated torque, the current flow and the speed of electrical machine 1 are represented. Assuming an unchanging voltage of the vehicle electrical system, in the exemplary embodiment of a nominal voltage of 48 V, a suitable current flow and, therefrom, the corresponding torque are then determined from an electric power, for example.

Desired mechanical torque MM, as well as upper mechanical limit MMO and/or lower mechanical limit MMU are transmitted to a belt drive management 18. This belt drive management 18 is included in a powertrain management 20, for example. Belt drive management 18 converts desired mechanical torque MM, as well as upper mechanical limit MMO, and/or lower mechanical limit MMU as the case may be, to the rotational speed of the crankshaft, so that all torques have a common reference base.

Figure 3:
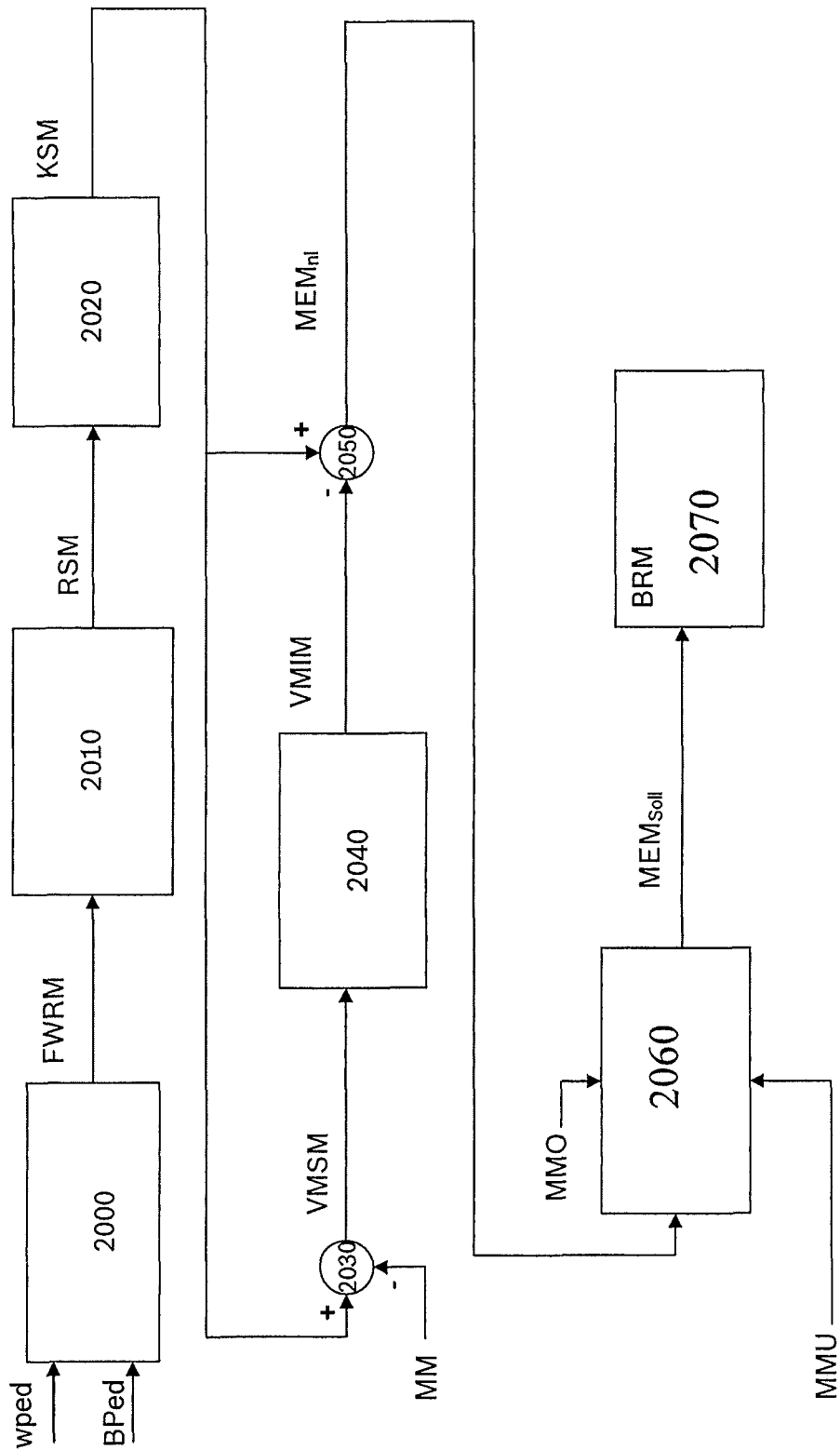
FIG. 3 schematically shows the functional sequence of the method according to the present invention.

Using the method illustrated in FIG. 3, for example, powertrain management 18 determines desired mechanical torque $MEM_{desired}$ on the basis of desired mechanical torque MM, upper mechanical limit MMO and/or lower mechanical limit MMU. This desired mechanical torque $MEM_{desired}$ is fed to electrical machine management 14 which drives electrical machine 1 to produce a torque that corresponds to desired mechanical torque $MEM_{desired}$. As a result, electrical machine 1 generates current flow $I_{EM}$ of the electrical machine, which is at least partially supplied to or drawn from power battery 3, as indicated by the hatched arrow.

Power battery 3 includes a control logic which ascertains instantaneous battery current $I_{Bat}$, battery voltage $U_{Bat}$ and state of charge SOC, and transmits them to an energy management 12. It may optionally be provided that electrical machine management 14 transmits the value of current flow $I_{EM}$ (for example, determined as an estimated value) of electrical machine 1 to energy management 12. Energy management 12 determines desired electric power PE, as well as upper electrical limit PEO and/or lower electrical limit PEU, and transmits them to conversion block 16 of electrical machine management 14.

In the exemplary embodiment, powertrain management 18 and energy management 14 are spatially combined and integrated in shared control unit 8.

FIG. 3 shows exemplarily the functional sequence of the method according to the present invention in powertrain management 20. In a step 2000, the actuation level of accelerator pedal wPed and the actuation level of brake pedal Bped are determined, and wheel torque FWRM required by the driver is determined therefrom. This is fed to a step 2010 where torque-controlling interventions, such as driving dynamics interventions (for example, by ESP) and/or transmission intervention (for example, in the case of gearshift processes) are considered, in order in this way to determine desired wheel torque RSM to be adjusted at the driven wheel that is then fed to a step 2020. In step 2020, desired clutch torque KSM is then determined from desired wheel torque RSM.

In step 2030, desired combustion engine torque VMSM is determined as desired clutch torque KSM minus desired mechanical torque MM. In a step 2040, desired combustion engine torque VMSM is adjusted by control unit 8 by controlling the manipulated variables of the combustion engine accordingly; i.e., the combustion engine adjusts a torque that corresponds to desired combustion engine torque VMSM. For example, via a modeling or also alternatively a sensor system, desired combustion engine torque VMIM is determined in step 2040, thus, the torque that the combustion engine actually produces. In step 2050, desired mechanical torque $MEM_{n1}$, that is not limited, is determined as the difference between desired clutch torque KSM and desired combustion engine torque VMIM. Desired mechanical torque $MEM_{n1}$, that is not limited, is fed to limiting step 2060 where desired mechanical torque $MEM_{desired}$ is determined. If desired mechanical torque $MEM_{n1}$, which is not limited, is greater than upper mechanical limit MMO, desired mechanical torque $MEM_{desired}$ is selected to equal upper mechanical limit MMO. If desired mechanical torque $MEM_{n1}$, that is not limited, is lower than mechanical limit MMU, desired mechanical torque $MEM_{desired}$ is selected to equal lower mechanical limit MMU. Alternatively, desired mechanical torque $MEM_{desired}$ is selected to equal desired mechanical torque $MEM_{n1}$ that is not limited. In step 2070, desired mechanical torque $MEM_{desired}$ is transmitted to electrical machine management 14.

FIG. 3 shows how desired electric power PE, as well as upper electrical limit PEO and lower electrical limit PEU are determined in energy management 12.

As a function of state of charge SOC of power battery 3, desired electric power PE is determined by a desired power characteristic curve 120 or, in some instances, by an optional desired power characteristic curve in overrun condition 130. The engine control communicates whether or not an overrun condition is present, for example, by an "on/off" flag. It may be provided that, when this flag indicates that the overrun condition is "on," the desired electric power is determined in accordance with the desired power characteristic curve in overrun condition 130 and, alternatively, by desired power characteristic curve 120.

As a function of state of charge SOC of power battery 3, upper electrical limit PEO is determined by a boost characteristic curve 110. Analogously, lower electrical limit PEU is determined by a brake characteristic curve 100.

Figure 4:
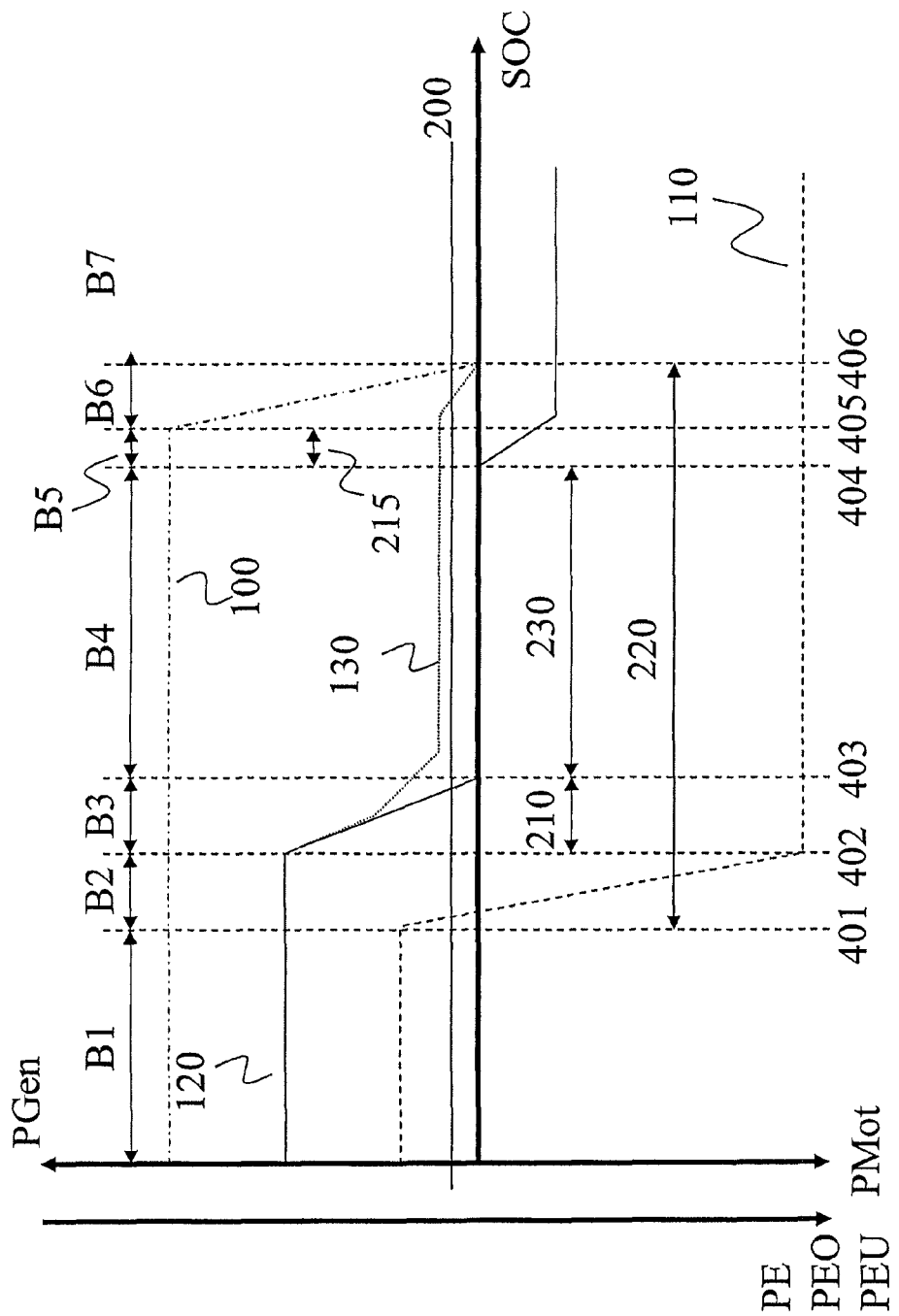
FIG. 4 schematically shows the dependence of the desired electric power levels of the electrical machine as a function of the state of charge of the power battery.

In FIG. 4, state of charge SOC of power battery 3 is located on the abscissa and the electric power on the ordinate. A motor electric power is plotted downwards; a regenerative power upwards; i.e., desired positive power PE and upper, respectively lower limit PEO/PEU are plotted downwards on a positive axis.

State of charge SOC is subdivided by six threshold values (in ascending order: first threshold value 401, second threshold value 402, third threshold value 403, fourth threshold value 404, fifth threshold value 405 and sixth threshold value 406) into altogether seven ranges: a first range B1 between state of charge SOC=0 and a first threshold value; a second range B2 between a first threshold value 401 and a second threshold value 402; a third range B3 between a second threshold value 402 and a third threshold value 403; a fourth range B4 between a fourth threshold value 404 and a fifth threshold value 405; a sixth range B6 between a fifth threshold value 405 and a sixth threshold value 406; and a seventh range in the case of a state of charge greater than sixth threshold value 406.

A dot-dash line indicates brake characteristic curve 100, which, in the case of states of charge SOC lower than fifth threshold value 405, assumes a substantially constant value of positive regenerative power PGen. This positive regenerative power PGen is selected in a way that allows it to be supplied by electrical machine 1 and power battery 3 during a time period of a few seconds, for example, 5 s. Brake characteristic curve 100 then falls off to sixth threshold value 406, decreasing continuously to 0, and, in seventh range B7, is constantly=0 as a function of state of charge SOC. It is also possible to select it to constantly equal vehicle system power 200 in seventh range B7.

Likewise shown is boost characteristic curve 110 which, given a state of charge SOC greater than second threshold value 402, assumes a substantially constant motor power PMot. This motor power PMot is selected in a way that allows it to be supplied by electrical machine 1 and power battery 3 during a time period of a few seconds, for example, 5 s. The boost characteristic curve then drops continuously to 0 and below in second range B2 in response to falling state of charge SOC, thus returns to a regenerative power. This regenerative power PGen continues to increase in response to state of charge SOC of power battery 3 falling further, and exceeds electrical system load 200 before reaching first threshold value 401. In first range B1, regenerative power PGen given by the boost characteristic curve assumes an essentially constant value as a function of state of charge SOC.

Electrical system load 200 is determined in energy management 12, for example, as a product of electrical system current $I_{BN}$ and nominal voltage of the high-voltage electrical sub-system (48 V in the exemplary embodiment). Electrical system current $I_{BN}$ may be determined, for example, as a difference between current flow $IE_M$ of electrical machine 1 and battery current $I_{Bat}$.

In the entire state-of-charge range SOC of power battery 3, normal driving characteristic curve 120 (solid line) is located above boost characteristic curve 110 (i.e., a higher regenerative power PGen, respectively a lower motor power PMot is indicated), and below brake characteristic curve 100 (i.e., a lower regenerative power PGen, respectively a greater motor power PMot is indicated). In first range B1 and second range B2, normal driving characteristic curve 120 assumes an essentially constant value of positive regenerative power PGen. This regenerative power PGen, for example, is selected in a way that allows power battery 3 to be continuously charged with this power, thus, for example, until state of charge SOC exceeds second threshold value 402.

It then drops continuously in third range B3 to specifiable load threshold 200 in response to increasing state of charge SOC. In fourth range B4, regenerative power PGen, as well as motor power Pmot are =0; and, in fifth range B5, respectively in sixth range B6, motor power Pmot given by normal driving characteristic curve 120 rises continuously in response to increasing state of charge SOC of power battery 3.

A dot-dash line indicates optional overrun characteristic curve 130 which, in first range B1 and in second range B2, conforms with normal driving characteristic curve 120, and, in third range B3, in fourth range B4, in fifth range B5, and in sixth range B6, indicates a regenerative power PGen that resides between normal driving characteristic curve 120 and brake characteristic curve 100. Positive regenerative power PGen given by overrun characteristic curve 130 initially continuously decreases in third range B3 and fourth range B4 to a value that is above specifiable load threshold 200. In response to a state of charge SOC that continues to rise, regenerative power PGen of overrun characteristic curve 130 is then essentially constant in fourth range B4 and in fifth range B5, and then falls continuously to 0 in sixth range B6 in response to rising state of charge SOC. In seventh range B7, both regenerative powers PGen, as well as motor powers PMot of overrun characteristic curve 130 are =0.

In first range B1, which corresponds to a state of charge SOC of power battery 3 that is lower than permissible state of charge SOC of power battery 3, all characteristic curves are to be selected to correspond to a regenerative power PGen that is higher than the electrical system load. Thus, in this range, boost characteristic curve 100 is to be selected so as to ensure that it is reliably above the maximally occurring electrical system load, for example. Alternatively, in this range, regenerative power PGen corresponding to boost characteristic curve 110 may also be dynamically adapted as a function of current electrical system load 200, for example, as electrical system load 200 plus a fixed power, for instance, 500 W.

The representation of FIG. 4, where negative values of the ordinate correspond to a motor operation of electrical machine 1, and where the positive values of the ordinate correspond to a regenerative operation of electrical machine 1, allows for the following simple version: If regenerative power in FIG. 3 is greater than electrical system load 200, then power battery 3 is charged, and state of charge SOC increases correspondingly. Analogously, state of charge SOC drops when regenerative power PGen is lower than electrical system load 200.

The state-of-charge range between second threshold value 402 and third threshold value 403 represents a boost reserve 210, i.e., in this second range B2 of state of charge SOC, a boosting at maximum possible boost power is available (while this maximum possible boost power is no longer available at lower state of charge SOC).

Analogously, the state-of-charge range between fourth threshold value 404 and fifth threshold value 405 represents a recuperation reserve 215, i.e., in this fifth range B5, recuperation at maximum possible regenerative power is available.

The state-of-charge range between first threshold value 401 and sixth threshold value 406 represents the usable state-of-charge range 220; i.e., in normal operation, state of charge SOC always varies in this state-of-charge range 220 and does not leave the same.

The state-of-charge range between third threshold value 403 and fourth threshold value 404 represents plateau region 230 in which desired electric power PE given by desired power characteristic curve 230 does not change as a function of state of charge SOC. Thus, third threshold value 403 represents the lower limit of plateau region 230; fourth threshold value 404 the upper limit of plateau region 230.

In the exemplary embodiment shown in FIG. 4, the regenerative power PGen given by desired power characteristic curve 120 and/or the desired power characteristic curve in overrun condition 130 are/is constant as a function of state of charge SOC in second range B2, and then bend downwards at the transition to the third range, and drop off to zero in response to increasing state of charge SOC. State of charge SOC, where this drop begins, may also reside already in second range B2 or in third range B3.

Figure 5:
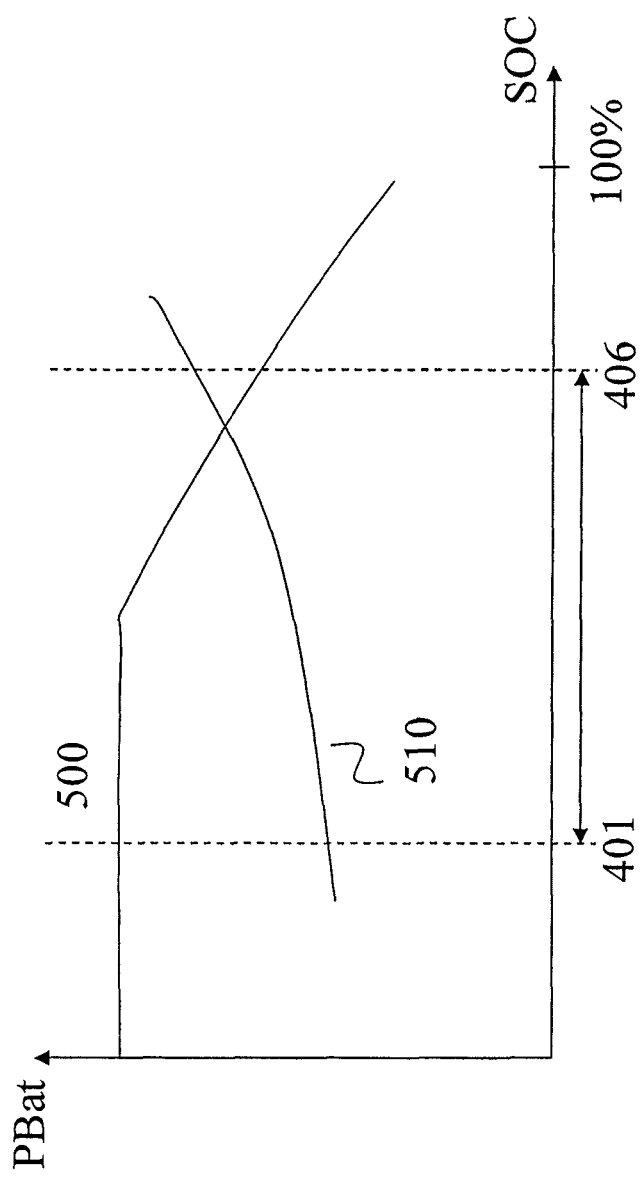
FIG. 5 schematically shows the performance characteristics of a power battery.

To illustrate the selection of first threshold value 401 and sixth threshold value 406, reference is made to FIG. 5. Shown here is a battery power $P_{Bat}$ of power battery 3 (given by the product of battery current $I_{Bat}$ and battery voltage $U_{Bat}$) over state of charge SOC of power battery 3. A charge characteristic curve 500 reflects the characteristic relationship between battery power $P_{Bat}$ and state of charge SOC during charging of the battery; a discharge characteristic curve 510 during discharging.

At lower values of the state of charge, charge characteristic curve 500 assumes an approximately constant value of battery power $P_{Bat}$. At a characteristic value, for example, at a state of charge SOC of approximately 60%, battery power $P_{Bat}$ begins to fall in response to increasing state of charge SOC. Battery power $P_{Bat}$ characterized by discharge characteristic curve 510 increases over the entire range of state of charge SOC in response to rising state of charge SOC.

The service life of power battery 3 is characteristically dependent on the selected width of usable state-of-charge range 220—the wider usable state-of-charge range 220 is selected to be, the shorter is the lifetime of power battery 3. By weighing the advantages of a wide, usable state-of-charge range 220 over the disadvantages of a shortened service life, it is possible to establish the width of usable state-of-charge range 220, for example, as 50% of the total width of the range of possible states of charge SOC. On the other hand, to a large degree, the position of state-of-charge range 220 does not have any significant effect on the service life of power battery 3, so that first threshold value 401 and sixth threshold value 406 may be freely selected within a wide range from the viewpoint of the service life of power battery 3, provided only that the interval therebetween be equal to the selected width of usable state-of-charge range 220. For example, first threshold value 401 may be selected to equal 30%, and sixth threshold value 406 to equal 80%.

Following fixed first threshold value 401, second threshold value 402 may be advantageously selected in a way that allows the gradient of boost characteristic curve 110 to be as steep as possible within the range between first threshold value 401 and second threshold value 402, however, to be so flat that it is not noticed by the driver. This means that if motor power PMot of electrical machine 1 is reduced during a boost process due to the discharging of power battery 3, this should not have any perceivable consequences for the driver. This may be determined by driving tests, for example.

In the same way, following fixed sixth threshold value 406, fifth threshold value 405 may be selected in a way that allows the gradient of brake characteristic curve 100 to be as steep as possible within the range between fifth threshold value 405 and sixth threshold value 406, however, to be so flat that it is not noticed by the driver.

Following fixed second threshold value 402, third threshold value 403 may be selected in a way that allows boost reserve 210 to have a characteristic selected magnitude. This magnitude of boost reserve 210 indicates the characteristic period of time during which a boost operation may be carried out at maximum motor power PMot subsequently to the charging of power battery 3 during driving operation controlled by desired power characteristic curve. This characteristic time period may be selected, for example, to be a few seconds, for instance, 5 s.

In the same way, following fixed fifth threshold value 405, fourth threshold value 404 may be selected in a way that allows recuperation reserve 215 to have a characteristic selected magnitude. This magnitude of recuperation reserve 215 indicates the characteristic period of time during which recuperation may be carried out at maximum regenerative power PGen subsequently to the discharging of power battery 3 during driving operation controlled by desired power characteristic curve 120. This characteristic time period may be selected, for example, to be a few seconds, for instance, 5 s.

Figure 6:
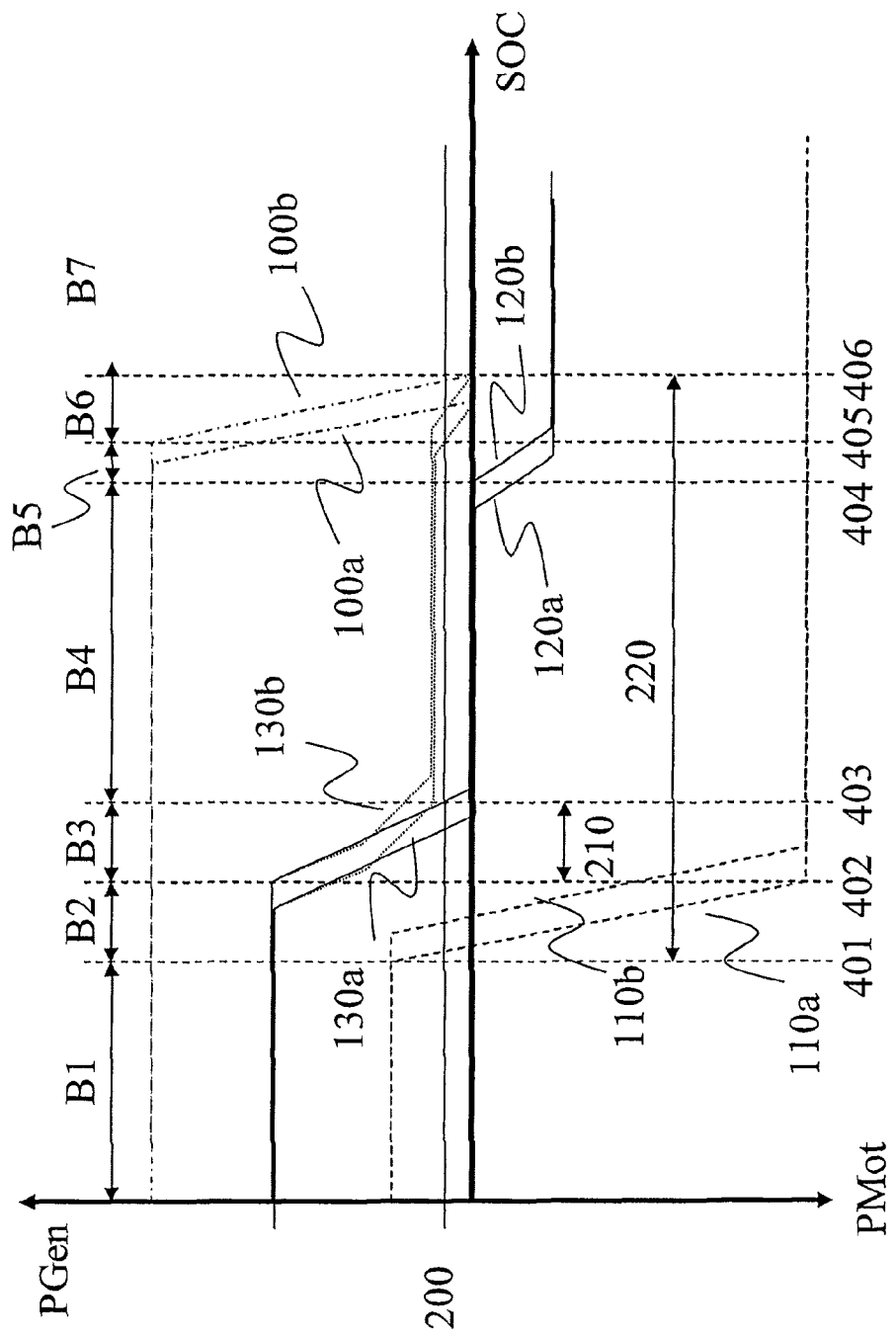
FIG. 6 schematically shows the dependence of desired electric power levels of the electrical machine as a function of the state of charge of the power battery at a given hysteresis.

FIG. 6 shows a further specific embodiment of the present invention where the characteristic curves illustrated in FIG. 4, thus brake characteristic curve 100, boost characteristic curve 110, normal driving characteristic curve 120 and overrun characteristic curve 130 have each been replaced by a pair of characteristic curves that are displaced relative to each other along the abscissa on which state of charge SOC of power battery 3 is shown. FIG. 4 shows a left brake characteristic curve 100*a*, a right brake characteristic curve 100*b*, a left boost characteristic curve 110*a*, a right boost characteristic curve 110*b*, a left normal driving characteristic curve 120*a*, a right normal driving characteristic curve 120*b*, a left overrun characteristic curve 130*a* and a right overrun characteristic curve 130*b*.

In this exemplary embodiment, the method according to the present invention functions analogously to the one previously explained, in each case, a characteristic curve of each pair used (left/right characteristic curve) being selected in order to implement the method according to the present invention using the brake characteristic curve and/or the boost characteristic curve and/or the normal driving characteristic curve and/or the overrun characteristic curve.

If state of charge SOC of power battery 3 drops, then the left characteristic curve of a pair of characteristic curves is selected; if state of charge SOC increases, then the right characteristic curve is selected. In this manner, the characteristic curves are provided with hystereses, thereby ensuring that more readily reproducible performance characteristics result so that the regenerative, respectively driving torques defined by these characteristic curves that change as a function of the state of charge are not reduced for a short period of time and increased again shortly thereafter.

What is claimed is:

1. A device for operating a drivetrain which includes an electrical machine configured to be selectively operated as at least one of a generator and a motor, the electrical machine being electrically coupled to a power battery, the device comprising:
an energy management unit connected to the power battery;
an electrical machine management unit; and
a powertrain management unit configured for transmitting a desired mechanical torque to the electrical machine management unit, wherein the powertrain management unit is distinct from the energy management unit;
wherein the energy management unit is configured for transmitting at least one of a desired electric power, a lower electrical limit, and an upper electrical limit to the electrical machine management unit, and wherein the electrical machine management unit is configured for controlling the electrical machine to generate the desired mechanical torque, and wherein the electrical machine management unit is configured for transmitting at least one of a desired mechanical torque, a lower mechanical limit, and an upper mechanical limit to the powertrain management unit, and wherein the mechanical setpoint torque is determined on the basis of at least one of the desired mechanical torque, the upper mechanical limit, and the lower mechanical limit, and wherein the desired mechanical torque is determined from the desired electric power.

2. The device as recited in claim 1, wherein the device is configured to control the electric machine such that a power generated by the electrical machine is (i) not greater than the power corresponding to the upper electrical limit, and (ii) not less than the power corresponding to the lower electrical limit.

3. The device as recited in claim 1, wherein the electrical machine management unit includes a conversion block configured for at least one of (i) converting the desired electric power into the desired mechanical torque, (ii) converting the lower electrical limit into the lower mechanical limit, and (iii) converting the upper electrical limit into the upper mechanical limit.

4. The device as recited in claim 1, wherein the energy management unit is configured for receiving at least one of a state of charge of the power battery electrically coupled to the electrical machine, a battery current of the power battery, and a battery voltage of the power battery.

5. The device as recited in claim 1, wherein the electrical machine management unit is configured for determining a current flow of the electrical machine and for transmitting the determined current flow of the electrical machine to the energy management unit.

6. The device as recited in claim 5, wherein the electrical machine management unit is integrated in a control unit for controlling the electrical machine.

7. The device as recited in claim 5, wherein at least two of the energy management unit, the electrical machine management unit, and the powertrain management are integrated in a common control unit for controlling the electrical machine.

8. The device as recited in claim 7, wherein the energy management unit is integrated in the control unit for controlling the electrical machine.

9. The device as recited in claim 7, wherein the power train management unit is not integrated in the control unit for controlling the electrical machine.

10. The device as recited in claim 7, wherein the control unit includes the energy management unit and the powertrain management unit.

11. The device as recited in claim 10, wherein the control unit does not include the electrical machine management unit.

\* \* \* \* \*